United States Patent
Pfeiffer et al.

(10) Patent No.: US 9,895,951 B2
(45) Date of Patent: Feb. 20, 2018

(54) ELECTROMECHANICAL ACTUATING DRIVE

(71) Applicant: ZF Friedrichshafen AG, Friedrichshafen (DE)

(72) Inventors: Daniel Pfeiffer, Berg (DE); Martin Hoffmann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/910,739

(22) PCT Filed: Jul. 24, 2014

(86) PCT No.: PCT/EP2014/065863
§ 371 (c)(1),
(2) Date: Feb. 8, 2016

(87) PCT Pub. No.: WO2015/022158
PCT Pub. Date: Feb. 19, 2015

(65) Prior Publication Data
US 2016/0193892 A1 Jul. 7, 2016

(30) Foreign Application Priority Data
Aug. 12, 2013 (DE) .................. 10 2013 215 859

(51) Int. Cl.
*B60G 21/055* (2006.01)
*H02K 5/22* (2006.01)
(Continued)

(52) U.S. Cl.
CPC ...... *B60G 21/0555* (2013.01); *B60R 16/0215* (2013.01); *H02K 5/225* (2013.01);
(Continued)

(58) Field of Classification Search
CPC ............ B60G 21/0555; B60G 16/0215; B60G 2202/42; B60G 2204/11; B60G 2204/202;
(Continued)

(56) References Cited

U.S. PATENT DOCUMENTS 4,045,761 A * 8/1977 Peterson ................ H01H 37/56
310/68 C
5,240,092 A 8/1993 Eachus
(Continued)

FOREIGN PATENT DOCUMENTS

DE             274 519 A1   12/1989
DE    20 2004 002 254 U1    5/2004
(Continued)

OTHER PUBLICATIONS

"Elektromechanischer Wankstabilisator, Aktiver Zentralstabilisator zur Verbesserung der Fahrdynamik", Silver Atena, Jun. 3, 2012, 2 pages.
(Continued)

*Primary Examiner* — Paul N Dickson
*Assistant Examiner* — Timothy Wilhelm
(74) *Attorney, Agent, or Firm* — Davis & Bujold, PLLC; Michael J. Bujold (57) ABSTRACT

An electric roll control stabilizer for a vehicle, having an outer housing that rotates about a longitudinal axis, a wiring harness has at least one electric supply lead and/or electric control lead is connected at its first end to a first connection terminal provided on the outer housing and at its second end to a second fixed in position connection terminal. In an area of the first terminal, the harness extends tangential to or concentrical with an outer enveloping surface of the outer housing or a cylindrical structural element which is attached rotationally fixed and whose outer diameter is smaller than the diameter of the outer housing. From the area of the first
(Continued)

terminal, the wiring harness extends concentrically with and is spaced from the outer enveloping surface, and the wiring harness is arranged in a transverse plane of the outer housing or the cylindrical structural element that passes through the first terminal.

20 Claims, 4 Drawing Sheets (51) Int. Cl.
    *H02K 5/26*     (2006.01)
    *H02K 26/00*     (2006.01)
    *B60R 16/02*     (2006.01)
    *H02G 11/02*     (2006.01)

(52) U.S. Cl.
    CPC ............... *H02K 5/26* (2013.01); *H02K 26/00* (2013.01); *B60G 2202/42* (2013.01); *B60G 2204/11* (2013.01); *B60G 2204/202* (2013.01); *B60G 2206/427* (2013.01); *H02G 11/02* (2013.01); *H02K 2213/09* (2013.01)

(58) Field of Classification Search
    CPC .... B60G 2206/427; H02K 26/00; H02K 5/26; H02K 5/225; H02K 2213/09; H02K 11/02; H02G 11/02
    See application file for complete search history.

(56) References Cited

U.S. PATENT DOCUMENTS

| | | | | |
|---|---|---|---|---|
| 5,307,038 | A * | 4/1994 | Ishimaru | F16D 27/112 |
| | | | | 192/84.961 |
| 5,687,823 | A * | 11/1997 | Nakagawa | F16D 9/02 |
| | | | | 192/84.961 |
| 6,116,930 | A | 9/2000 | Sakata | |
| 6,428,019 | B1 * | 8/2002 | Kincad | B60G 21/0553 |
| | | | | 280/124.106 |
| 7,237,785 | B2 * | 7/2007 | Kraus | B60G 21/0555 |
| | | | | 280/124.106 |
| 7,309,074 | B2 * | 12/2007 | Taneda | B60G 17/019 |
| | | | | 280/124.106 |
| 7,744,098 | B2 * | 6/2010 | Sano | B60G 17/0162 |
| | | | | 280/5.511 |
| 7,772,946 | B2 * | 8/2010 | Oh | H01R 13/6666 |
| | | | | 335/219 |
| 7,819,036 | B2 | 10/2010 | Haneball et al. | |
| 7,832,739 | B2 * | 11/2010 | Pinkos | B60G 3/20 |
| | | | | 192/69.6 |
| 8,368,262 | B2 * | 2/2013 | Ishizue | H02K 5/08 |
| | | | | 310/43 |
| 8,395,047 | B2 * | 3/2013 | Adachi | B60L 3/0007 |
| | | | | 174/74 R |
| 8,905,414 | B2 * | 12/2014 | Khanlarov | B60G 21/055 |
| | | | | 280/124.106 |
| 8,952,584 | B2 * | 2/2015 | Asahi | H02K 5/225 |
| | | | | 310/71 |
| 2007/0210666 | A1 * | 9/2007 | Yoshida | H02K 3/50 |
| | | | | 310/191 |
| 2008/0106055 | A1 | 5/2008 | Pinkos et al. | |
| 2011/0005264 | A1 * | 1/2011 | Lee | F25D 23/021 |
| | | | | 62/449 |

FOREIGN PATENT DOCUMENTS

| | | |
|---|---|---|
| DE | 698 24 264 T2 | 6/2005 |
| DE | 10 2006 032 301 B3 | 2/2008 |
| DE | 10 2008 000 148 A1 | 7/2009 |
| DE | 10 2008 041 329 * | 3/2010 |
| EP | 1 746 708 A2 | 1/2007 |
| FR | 2 925 619 A1 | 6/2009 |
| JP | H09-19127 A | 1/1997 |

OTHER PUBLICATIONS

German Search Report Corresponding to 10 2013 215 859.9 dated Jun. 6, 2014.
International Search Report Corresponding to PCT/EP2014/065863 dated Sep. 9, 2015.
Written Opinion Corresponding to PCT/EP2014/065863 dated Sep. 9, 2015.

* cited by examiner

ELECTROMECHANICAL ACTUATING DRIVE

This application is a National Stage completion of PCT/EP2014/065863 filed Jul. 24, 2014, which claims priority from German patent application serial no. 10 2013 215 859.9 filed Aug. 12, 2013.

FIELD OF THE INVENTION

The invention concerns an electromechanical actuating drive, in which an outer housing or part thereof rotates about its longitudinal central axis, and wherein a wiring harness that consists of at least one electric supply lead and/or electric control lead is connected at a first end thereof to a first connection terminal provided on the outer housing and at a second end thereof to a second, positionally fixed connection terminal.

Furthermore, the invention concerns an electromechanical actuating drive, in which a cylindrical structural element extends concentrically starting from an outer housing, the outer diameter of the element being smaller than that of the outer housing, such that the outer housing and/or the cylindrical structural element rotate about the longitudinal central axis and carry a first electric connection terminal from which there extends a wiring harness that consists of at least one electric supply lead and/or electric control lead, which at its other end is connected to a second, positionally fixed connection terminal.

BACKGROUND OF THE INVENTION

Electromagnetic actuating drives in which a structural element provided with an electric supply lead or with control leads undergoes rotational movement, are known from a large number of applications. For example, these can be applications in robot technology, machine-tool technology, or automotive technology. In modern motor vehicles with active chassis regulation roll stabilizers, each with a stabilizer-half associated with the wheel suspensions, are used, these being contained in an outer housing and, to compensate roll movements of the vehicle body, they are rotated relative to one another by means of the actuating drive that serves as an actuator.

In such a case the actuator consists of an electric motor, which receives control signals such as a desired rotational angle and a required rotational direction, from a regulating device and from a high-ratio transmission by virtue of which the rotational speed of the electric motor is reduced to a specified rotational speed of the actuating drive. In addition, for example from a measurement device associated with the transmission, actual values of a rotational angle are transmitted to the regulating device. For that reason, from the regulating device arranged positionally fixed on the chassis of the vehicle, leads pass to an outer housing of at least one of the stabilizer halves.

An electromechanical actuating drive of the type indicated in the claims is known from a fact-sheet of the company Silver Atena on the Internet with the title "Electromechanical roll stabilizer, Active central stabilizer for the improvement of driving dynamics", page information modified on Jun. 3, 2012. In this case the outer housing consists of a first section of cylindrical design and a second section of cubic design. On two flat surfaces of the cubic section are provided first terminals separated from one another by an angle of 90°, from which in one case two leads and in the other case one lead extend, which leads at their other ends are brought together in a plug. From the first terminal, the leads first run parallel to a longitudinal axis extending through the stabilizer halves and the outer housing, and are then spread relative to one another and change to a helical course. In an area where the leads of the wiring harness are brought together for connection to the plug, the helical path changes to a radius. Before the wiring harness is attached to the plug, it is orientated at an angle to the longitudinal axis of the outer housing and the stabilizer halves.

SUMMARY OF THE INVENTION

The purpose of the present invention is to run a wiring harness between a rotary outer housing or part thereof and a positionally fixed connection terminal in such manner that during the operation of the electromechanical actuating drive, the wiring harness is not damaged despite the relative movements of the outer housing. Furthermore, the wiring harness and its end connections should take up as little fitting space as possible.

These objectives are achieved by virtue of the characterizing features of and advantageous further developments of the invention as described below.

According to the description below, in the area of the first terminal the first end of the wiring harness should extend tangentially to or concentrically with an outer enveloping surface of the outer housing or of a cylindrical structural element that is connected in a rotationally fixed manner thereto, and starting from that area the wiring harness should extend concentrically a radial distance away from the outer enveloping surface, in such manner that the at least one electric supply lead and/or electric control lead is in each case arranged in a transverse plane of the outer housing or the cylindrical structural element that extends through the first connection terminal. The outer housing or a part of it should undergo rotational movement when the actuating drive is activated, so that the position of the first terminal changes correspondingly.

Thus, the individual leads of the wiring harness, which as already stated are in the form of an electric supply lead and/or an electric control lead, start from the first terminal and run tangentially to or concentrically with the outer housing or the cylindrical structural element, in order then to extend in the circumferential direction of one of these structural units. The first sections coming from the terminal can therefore be straight or curved lead sections. These lie in a transverse plane with the lead sections following them, which at least partially enclose the outer housing or the cylindrical structural element.

If the first connection terminal is provided on the outer housing and the wiring harness at least partially surrounds the outer housing over its outer enveloping surface, it is appropriate to provide the first terminal in a recess of the outer housing and to arrange the wiring space in an area of the outer housing having a smaller outer diameter, so that the arrangement of the first terminal and the wiring harness does not increase the radial dimensions of the electromechanical actuating drive as a whole because of the arrangement of the wiring harness.

As also indicated, from the outer housing there can, however, also extend a concentric cylindrical structural element with a diameter smaller than that of the outer housing. In that case the first terminal for the wiring harness should be arranged radially relative to the cylindrical structural element, so that the corresponding first end of the wiring harness coming from it extends tangentially to or concentrically with the outer enveloping surface of the cylindrical structural element. In such a case too the radial structural dimensions of the actuating drive are not increased by the arrangement of the wiring harness, which in this case at least partially encloses the cylindrical structural element, and there is consequently no risk that the curved wiring harness, which expands or contracts depending on the rotational direction of the actuating drive, will collide with adjacent components and be damaged thereby. Since starting from the first terminal the wiring harness runs in a transverse plane in the circumferential direction, no twisting torques are imposed on the leads and on the first terminal, which would otherwise damage those components. Thus, according to the invention it is possible to shape and connect the leads in a manner that avoids collisions and alternating bending and that is unaffected by temperature variations, and will consequently have a long useful life.

Alternatively, in accordance with a variation as described below, it is provided that in the area of the first connection terminal the first end of the wiring harness runs tangentially to or concentrically with an outer enveloping surface of the cylindrical structural element and, starting from that area, the wiring harness follows a helical path.

According to this variation, starting from its first section that runs tangentially to or concentrically with the outer enveloping surface of the cylindrical structural element the wiring harness extends in a helical path to the second connection terminal. In this case, at most only small twisting torques act in the leads and upon the first terminal. Furthermore, along its helical course the wiring harness is protected within the radial fitting space provided by the diameter reduction of the cylindrical structural element. In this case the outer housing and the cylindrical structural element can also be connected to one another in a rotationally fixed manner, so that the cylindrical structural element includes the first terminal and a conducting connection to the inside of the outer housing is formed.

Compared with this, according to the Silver Atena publication "Electromechanical roll stabilizer; Active central stabilizer for the improvement of driving dynamics" the wiring harness is split, with two leads connected to a first terminal and a further lead connected to a second terminal separated by 90° from the first terminal. In this case, leads extend away from both terminals, each of which runs parallel to the longitudinal central axis of the actuating drive and then curves with a certain radius to merge into a helical path. The result of this is that during rotational movement of the outer housing large twisting torques occur both in the leads and at the two terminals, which result in premature damage to the terminals and leads. Moreover, these lead connections and lead paths demand additional fitting space, which is usually not available. The need for additional space results from the fact that the wiring harness extends radially outside the outer diameter of the actuating drive. In many applications, a corresponding fitting space within which the leads can run without risk of damage is not available, particularly in motor vehicles.

In the context of the present invention it is also provided that the first connection terminal is in the form of a plug. By means of the plug, which has a number of plug contacts to match the number of leads brought together in the wiring harness, a connection can be formed to a socket provided on the outer housing. There is of course the possibility of attaching the first terminal permanently to the outer housing, and in that case a corresponding connection can be formed to the electric drive of the actuator and to corresponding control elements.

In a further design of the invention the outer housing can be connected to the cylindrical structural element with the formation of a circular end face, and the first plug is provided with plug contacts that extend in the direction of the end face. This means that, as already explained, the individual leads of the wiring harness run into the plug tangentially or radially relative to the cylindrical structural element, while the plug contacts extend at a right-angle to the wiring harness. Consequently, in the end face there is a corresponding socket into which the angled plug, which is preferably sealed relative to the socket, is plugged. For safety, securing elements can be provided on the plug, by means of which the plug can be held on the end face so that it cannot be inadvertently detached. Alternatively a corresponding plug can be omitted, and in that case the first terminal holds the wiring harness and the individual leads are connected at an angle of 90° to corresponding lead sections passing to the inside of the outer housing.

In addition it is proposed that the wiring harness comprises at least two leads serving as an electric supply lead and/or an electric control lead, which are held relative to one another by at least one holder. This holder serves to guide the individual wires or leads relative to one another in such manner that they cannot chafe against one another and be damaged thereby. The holder or holders is/are preferably provided with an additional groove in which a sensor lead is placed. The sensor lead connects a sensor provided on the outer housing to the second terminal and does not, therefore, run to the first terminal or the first plug. Besides, the sensor lead can also pass, via a groove, into the first terminal or plug when this is formed by injection-molding a plastic around the first end of the wiring harness.

A further possibility is to attach the first plug to the cylindrical structural element by means of a clamping shell. The shell, which radially surrounds a corresponding section of the cylindrical structural element, can in this case be incorporated in the plastic injection molding of the first plug. It is also possible to provide a flange-like area on the shell by means of which the shell is fixed by screws to the front surface that extends between the outer housing and the cylindrical structural element.

In addition, over its outer surface the first plug can be covered by a protective sheet. Besides its function as a covering, the protective sheet should hold in place the sensor lead which, as explained earlier, runs within a groove of the first plug.

Besides, a lead joint that is largely exempt from twisting torques can be made if the second terminal is in the form of a second plug with its plug contacts extending substantially in the axial direction of the outer housing or the cylindrical structural element. Consequently, in the case of a plug this will also be an angled plug which, however, can also be replaced by a non-detachable second terminal within which a lead connection at an angle of 90° is made. Furthermore, it is of course also possible to provide the plug with plug contacts that extend in substantially the same direction as the leads entering the second plug.

A further design of the invention provides that at least one of the leads is provided with screening. Consequently, In the two terminals or plugs provided in this context, contacts must be provided by way of which the screening action is transmitted.

Furthermore, the outer housing of the actuating drive and/or the cylindrical structural element must be able to rotate relative to a positionally fixed articulation point to which the second terminal is connected, by an angle totaling at least 45°. During this rotational movement from one extreme position to the other extreme position the leads "breathe", i.e. in one case the corresponding sling of the wiring harness passing around the outer housing or cylindrical structural element expands and in the other case it contracts to the extent that it is still clear of the outer housing or cylindrical structural element by a small distance.

In a further design of the invention, the actuating drive with appropriate connections and positioning of its wiring harness is used as an actuator of a roll stabilizer provided in a motor vehicle. In this case the first connection terminal, in the form of a plug or a fixed connection, can be fixed on the outer housing and/or on the cylindrical structural element constituting half of the stabilizer. A corresponding active roll stabilizer comprises two stabilizer halves, which start at the actuator and are each connected to a wheel suspension of the motor vehicle. Appropriate adjustment of the stabilizer halves ensures that body tilt brought about by a transverse acceleration while driving round a curve can be compensated. For this purpose, by producing a twisting torque the stabilizer halves are rotated relative to one another so that rolling of the body is counteracted. In such an application of an electromechanical actuating drive, the following particular problems arise:

1. In the area of the engine space and the exhaust gas system the fitting space available for such an electromechanical actuating drive is very restricted, and the drive is exposed to severe temperatures and considerable vibrations.
2. The lead terminals must be designed to prevent the ingress of water, be it sprayed water or a stretch of standing or flowing water that the motor vehicle is driving through.
3. During an active roll compensation process the actuator has to carry out continual adjustments in various directions during which, to achieve a long enough useful life, the terminals and the wiring harness, which preferably comprises three leads, should be mechanically loaded as little as possible. The individual leads of the wiring harness must also be prevented from chafing against one another and thereby becoming damaged.

All these prerequisites are fulfilled by the arrangement, according to the invention, of a wiring harness on an actuator of a roll stabilizer, since radially with reference to the stabilizer half there is sufficient fitting space available, the plug is optimally sealed and by virtue of the lead connection and positioning, the mechanical loads are greatly reduced.

Moreover, it is provided that the mechanical adjustment device of the actuator is in the form of a high-ratio planetary gearset or a high-ratio strain wave gear. In both cases the relatively high rotational speed of the electric motor is stepped down to rotational actuating movement which is transmitted by the two stator halves to the individual wheel suspensions. In the case of a cycloid gear or strain wave gear, which serves to step down the rotational speed of the drive unit by a larger amount, the inner teeth of a ring gear and the outer teeth of a gearwheel or of a cylindrical steel sleeve are in partial engagement, the tooth numbers differing from one another in such manner that, for example, after a hundred revolutions of an eccentric or elliptical disk driving the inner wheel, the outer ring gear turns through only the path of one tooth.

The invention is not limited to the combination of characteristics described below. There are in addition possibilities for combining individual features with one another, provided that they emerge from the claims, the description of example embodiments given below, or directly from the drawing. The references in the claims to the drawing by means of indexes is not intended to restrict the protective scope of the claims.

BRIEF DESCRIPTION OF THE DRAWINGS

Besides, further features of the invention emerge from the following description and from the drawings, in which two example embodiments of the invention are shown in simplified form. The drawings show.

DETAILED DESCRIPTION OF THE PREFERRED EMBODIMENTS

Figure 1:
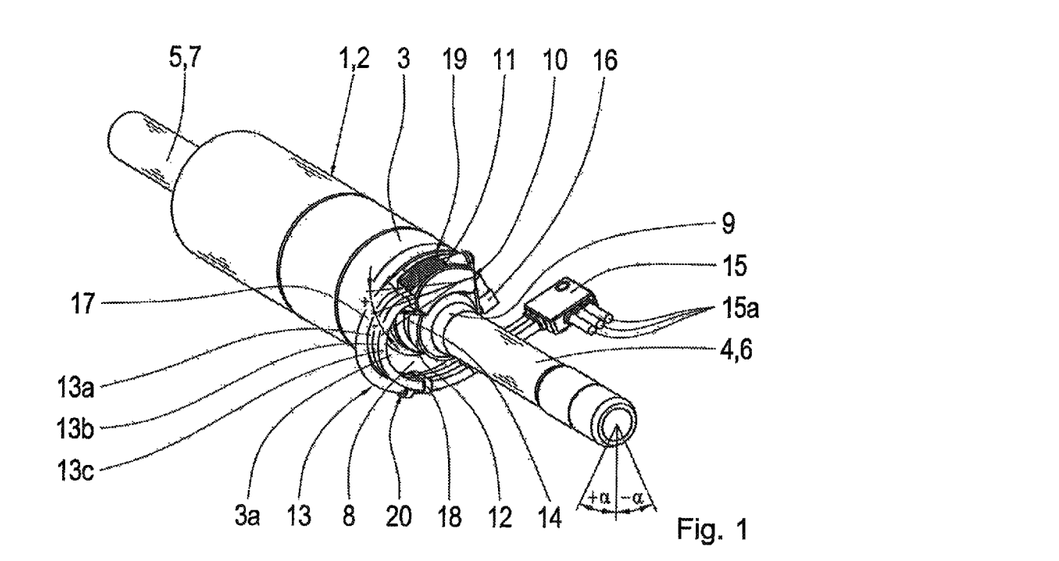
FIG. 1: A perspective representation of an electromechanical actuating drive provided with a wiring harness according to the invention, which serves as the actuator of an active roll stabilizer.

In FIG. 1 an electromechanical actuating drive is indexed 1. This serves as the actuator 2 of an active roll stabilizer for motor vehicles. This actuator 2 consists of an outer housing 3 and two cylindrical structural elements 4 and 5 that extend concentrically therewith, which in the present case are provided as stabilizer halves 6 and 7. On the inside of the outer housing 3 there is an electric motor (not shown in any more detail) and a high-ratio gear system by means of which the stabilizer halves 6 and 7 can be rotated in different rotational directions. The cylindrical structural element 4, which in the present application is also called a stabilizer half 6, is connected to the outer housing 3 in a rotationally fixed manner. For that purpose the outer housing 3 has a circular section 3*a* that forms an annular end face 8.

Part of the cylindrical structural element 4 or stabilizer half 6 is a flange 9 formed by a radial extension of the stabilizer half 6. On this flange 9 is arranged a first connection terminal 10 consisting of a first plug 11 with a shell 12 that fixes it onto the flange 9. Into the first plug 11 runs a wiring harness 13 that consists of leads 13*a*, 13*b* and 13*c*. In the first plug 11 the corresponding ends of these leads 13*a* to 13*c* are positioned in such manner that they extend substantially tangentially to an outer surface 14 of the flange 9 and therefore also tangentially to the cylindrical structural element 4 or stabilizer half 6.

Starting from the tangentially arranged end areas of the leads 13*a* to 13*c* inserted into the first plug 11, the leads extend in a curved path in a plane with their end areas and finally merge into a substantially straight section at the end of which they are connected to a second plug 15. This second plug 15 serves to form the connection with a positionally fixed plug socket (not shown) on the chassis of a motor vehicle. Arranged on the annular end face there is in addition a sensor unit 16, from which a sensor lead 17 emerges. As can also be seen from FIG. 1, the leads 13a, 13b and 13c are held in place relative to one another by a holder 18. The sensor lead 17 coming from the sensor unit 16 has guideways in the first plug 11 and in the holder 18, and for that purpose a groove 19 is provided in the first plug 11 and another groove 20 is provided in the holder 18.

Moreover, the second plug 15 is also made as an angled plug, i.e. plug contacts of this plug 15 extend at an angle of 90° to the leads 13a, 13b and 13c arranged in the plug. As can also be seen from FIG. 1, starting from a basic position the unit consisting of the outer surface 3 of the annular end face 8 and the stabilizer half 6 can rotate through an angle +α or an angle −α.

The further FIGS. 2 to 7 show further details of this arrangement.

Figure 2:
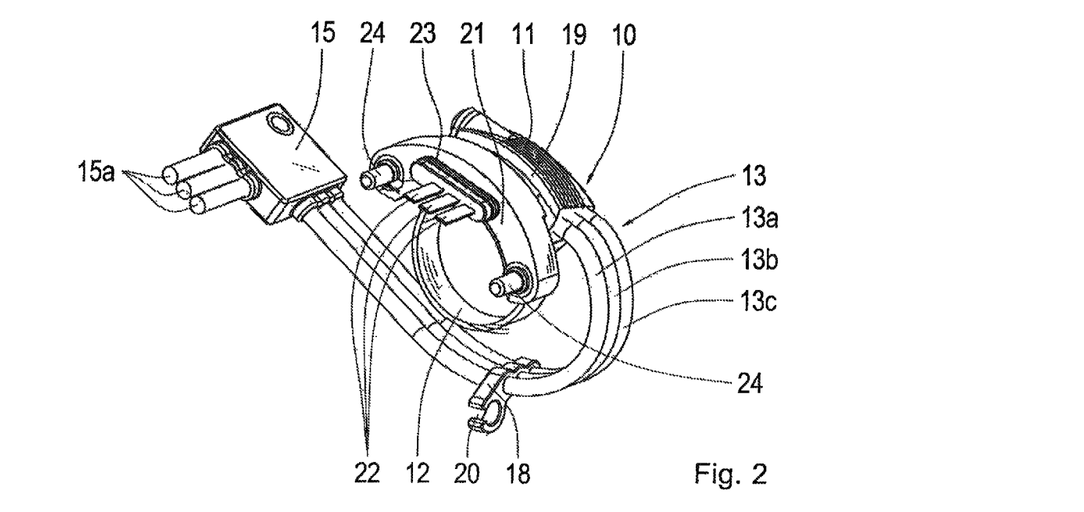
FIG. 2: A perspective view of the wiring harness used in accordance with FIG. 1, connected to a first and a second plug.

FIG. 2 shows a detailed view of the wiring harness 13 with the first plug 11 and the second plug 15. From the figure it can also be seen that the first plug 11 has a flange portion 21 from which plug contacts 22 of the first plug 11 extend. These plug contacts 22 are enclosed by an oval seal 23. The flange 21 also has guiding pins 24 that extend in the axial direction.

As can be seen in combination with the later FIG. 4, the plug contacts 22 of the first plug 11 can be introduced into a plug socket provided on the annular face 8 of the outer housing 3, so that a connection can be formed between the respective leads 13a, 13b or 13c and the electric motor and with certain control devices arranged within the outer housing 3. When this plug connection is formed, the seal 23 rests against a corresponding opening provided in the socket in order to protect the inside of the socket and so too the inside of the outer housing 3 against sprayed water and other water around the device.

Together with the insertion of the plug contacts, the guiding pins 24 are also inserted into receiving bores provided in the annular section 3a of the outer housing 3, so that the flange portion 21 as a whole is correctly positioned. For this purpose additional screws can also be provided, with which the flange portion 21 can be fixed to the annular end face 8. Besides, the first plug 11 is held in position on the section 9 by virtue of the shell 12. Furthermore, FIG. 2 shows the design of the holder 18, which is provided with the groove 20, while a corresponding groove 19 is formed on the first plug 11. FIG. 2 also shows that the wiring harness 13 is arranged in a plane with the first plug 11, and therefore that when the stabilizer half 6 carrying the first plug 11 rotates while at the same time the second plug 15 is fixed on the chassis of the motor vehicle, only the curvature of the harness changes so the leads 13a, 13b and 13c are not acted upon by any twisting forces.

Figure 3:
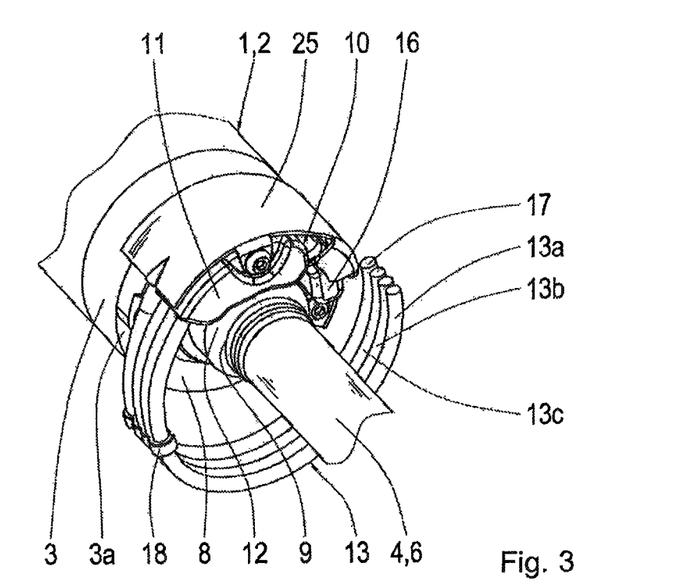
FIG. 3: A perspective view of a wiring harness according to the invention connected to an electromechanical actuating drive, without a second plug or terminal, wherein a first terminal is provided with a covering.

The details already described in connection with FIGS. 1 and 2 can essentially also be seen in FIG. 3, according to which a protective sheet 25 is fixed over the plug 11, which it surrounds radially and hence also holds the sensor lead 17 on the plug 11 in place in its groove 20.

Figure 4:
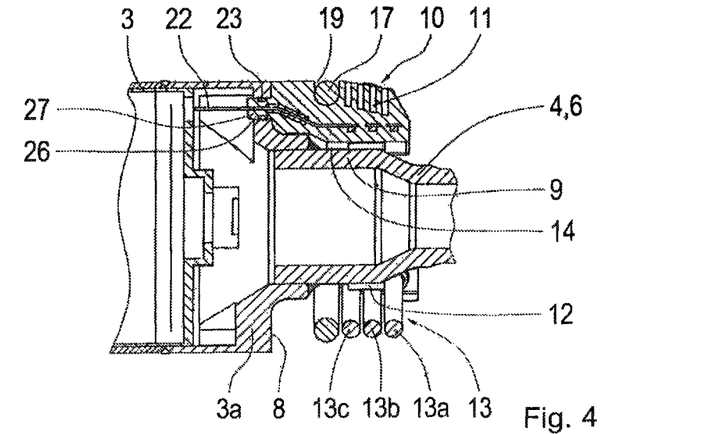
FIG. 4: A longitudinal section through a fixing arrangement of a first plug onto a cylindrical structural element, and an array of plug contacts on the inside of an outer housing of the electromechanical actuating drive.

Furthermore, FIG. 4 shows a longitudinal section through the arrangement of the first plug 11 in section 3a of the outer housing 3. For that purpose the annular section is provided with an opening 26 through which the plug contacts 22 are inserted. It can also be seen that in this arrangement there is no separate flange portion on the plug 11, but rather, the plug is directly in contact with the annular end face 8. In this case the plug contacts 22 are arranged in a holder 27, this holder being enclosed by the seal 23 that surrounds the opening 26. In addition, this FIG. 4 also shows the path followed by the leads 13a, 13b and 13c of the wiring harness 13 and makes it clear that the leads 13a to 13c and the sensor lead 17 lie in a plane with their guideways in the first plug 11.

Figure 5:
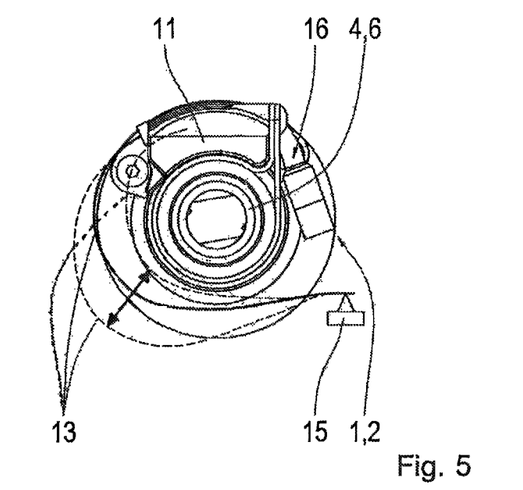
FIG. 5: A schematic representation of a first arrangement of the wiring harness according to the invention.
Figure 6:
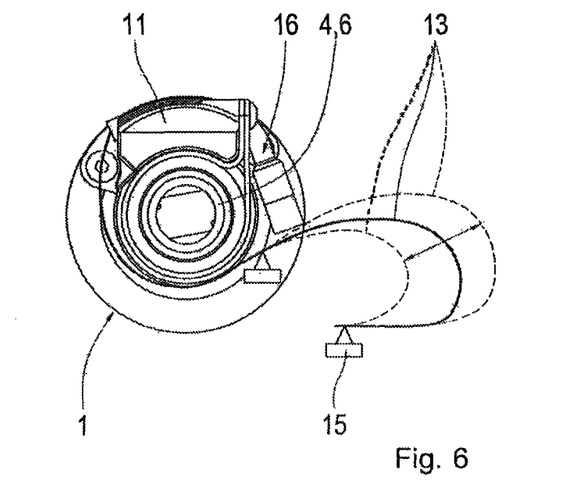
FIG. 6: A schematic representation of a second arrangement of a wiring harness according to the invention.
Figure 7:
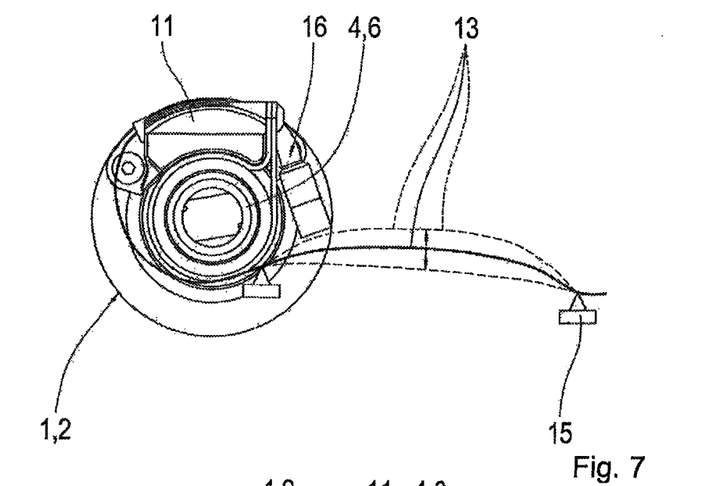
FIG. 7: A schematic representation of a third arrangement of a wiring harness according to the invention.

FIGS. 5, 6 and 7 show respectively different paths of the wiring harness 13 to the second plug 15. Here it can be seen how the wiring harness 13, which extends in a plane with the first plug 11 to the second, schematically represented plug 15, changes its shape when the actuator 2 is rotated from its middle position to its two extreme positions. This position change is also referred to as "breathing" of the leads. Depending on the guiding of the wiring harness 13, the harness 13 can sag at various points, which can be determined selectively.

Figure 8:
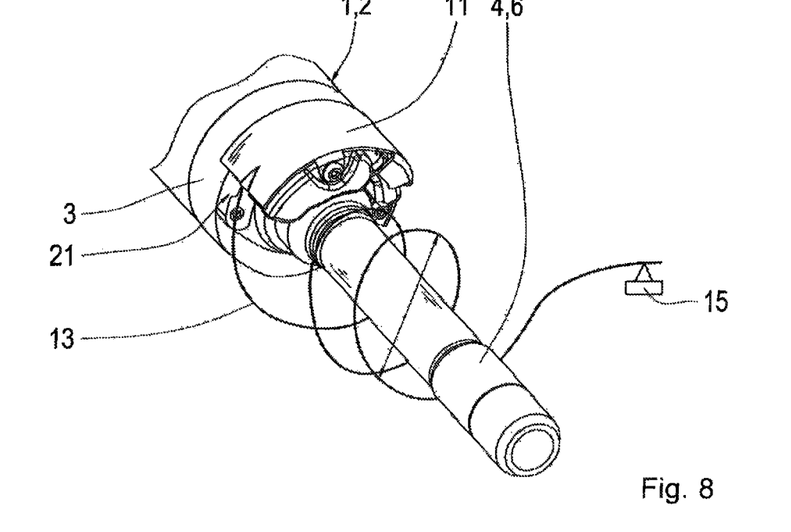
FIG. 8: A schematic representation of a fourth arrangement of a wiring harness according to the invention, in which it runs in the shape of a helix.

Finally, FIG. 8 shows an alternative solution in which the wiring harness 13 is laid in a spiral around the stabilizer half 6, i.e. along a helical path. In this connection "breathing" of the leads is also illustrated in FIG. 8.

From the illustrations it is evident that with the solution according to the invention, the connection of the wiring harness 13 to the stabilizer half 6 and thus to the outer housing 3, can be arranged tangentially or concentrically in such manner that the transmission of twisting torques to the wiring harness is avoided. Furthermore the individual leads 13a to 13c and the sensor lead 17 run parallel to one another so that they cannot chafe against one another. With this system solution arrangements in motor vehicles can be produced in which, depending on the vehicle type, very different fitting spaces are available for the arrangement of an active roll stabilizer.

For at least one of the leads 13a to 13c low-ohm screen cladding is provided. The respective screen claddings of the individual leads 13a, 13b and 13c are brought together on plug contacts in the first plug 11 and led into the aggregate. In the aggregate the screening is then interconnected with low-ohm connections. Since the actuator 2 has to be designed in such manner that it can operate below the wattage limits, the first plug 11 is provided with the seal 23 through which it is inserted in the outer housing. To conform to the space and volume requirements, a defined lead movement or lead dynamic has to be maintained in the vehicle. Once the transfer point on the chassis, i.e. the arrangement of the second plug 15 and the rotational angle have been established, the movement of the leads can be defined exactly. That is what results in the "breathing" of the leads represented in FIGS. 5 to 8 and described with reference to them.

INDEXES

1 Electromechanical actuating drive
2 Actuator
3 Outer housing
3a Annular section of 3
4 Cylindrical structural element
5 Cylindrical structural element
6 Stabilizer half
7 Stabilizer half
8 Annular end face on 3a
9 Flange of 4, 6
10 First connection terminal
11 First plug
12 Shell
13 Wiring harness
13a Lead 13b Lead
13c Lead
14 Outer enveloping surface of 9
15 Second plug
15a Plug contact of 15
16 Sensor unit
17 Sensor lead
18 Holder
19 Groove in 11
20 Groove in 18
21 Flange component
22 Plug contacts
23 Seal
24 Guiding pins
25 Protective sheet
26 Opening
27 Holder

The invention claimed is:

1. An electromechanical actuating drive (1), in which an outer housing (3), or part thereof, undergoes rotational movement about a longitudinal central axis,
a wiring harness (13) that comprises at least one electric supply lead and control lead (13a, 13b, 13c), the wiring harness has a first end and an opposite second end, the first end of the wiring harness is connected to a first connection terminal (10) provided on the outer housing (3), the second end of the wiring harness is connected to a second plug (15) that is fixed in a position radially further from the longitudinal central axis than a radially outer surface of the outer housing,
the first end of the wiring harness (13) extends either tangentially to or concentrically with an outer enveloping surface of either the outer housing (3) or a cylindrical structural element (4) connected to the outer housing in a rotationally fixed manner, and an outer diameter of the cylindrical structural element is smaller than an outer diameter of the outer housing (3), and
from the first end of the wiring harness, the wiring harness (13) extends concentrically with and a radial distance away from the outer enveloping surface (14), so that the at least one electric supply lead and the control lead (13a, 13b, 13c), in each case, lies in a transverse plane of either the outer housing (3) or the cylindrical structural element (4), and the transverse plane extends normal to the longitudinal central axis and the transverse plane passes through the first connection terminal (10).

2. The electromechanical actuating drive according to claim 1, wherein the first connection terminal (10) is in a form of a first plug (11).

3. The electromechanical actuating drive according to claim 2, wherein the outer housing (3) is connected to the cylindrical structural element (4) and forms, with the cylindrical structural element, an annular end face (8), and the first plug (11) comprises plug contacts (22) that extend toward the end face (8).

4. The electromechanical actuating drive according to claim 1, wherein the wiring harness (13) comprises at least two leads in a form of at least one of the electric supply lead and the electric control lead (13a, 13b, 13c) which are held in place, relative to one another, by at least one holder (18), and the at least one holder holds the at least two leads between the first connection terminal and the second plug.

5. The electromechanical actuating drive according to claim 4, wherein the holder (18) is provided with a receiving groove (20) for guiding a separate sensor lead (17), and the sensor lead (17) is guided in a circumferentially extending groove (19) of the first connection terminal.

6. The electromechanical actuating drive according to claim 2, wherein the first plug (11) is formed by injection molding plastic around the first end of the wiring harness (13) and, on an outer circumference of the first plug (11), a circumferentially extending groove (19) is provided to hold a separate sensor lead (17).

7. The electromechanical actuating drive according to claim 2, wherein the first plug (11) is held in place, on the cylindrical structural element (4), by a shell (12).

8. The electromechanical actuating drive according to claim 2, wherein an outer enveloping surface of the first plug (11) is covered by a protective sheet (25).

9. The electromechanical actuating drive according to claim 1, wherein the second plug is a second connection terminal which has plug contacts (15a) that extend substantially in an axial direction of either the outer housing or the cylindrical structural element.

10. The electromechanical actuating drive according to claim 1, wherein the at least one of the electric supply lead and the control lead (13a, 13b, 13c) is provided with cable screening.

11. The electromechanical actuating drive according to claim 1, wherein at least one of the outer housing (3) of the actuating drive (1) and the cylindrical structural element (4) is rotatable about an angle of at least 45° relative to a positionally fixed articulation point to which a second connection terminal (15) is connected.

12. The electromechanical actuating drive according to claim 1, wherein the electromechanical actuating drive is an actuator (2) of a roll stabilizer provided on a motor vehicle, and the first connection terminal is fixed on at least one of the outer housing (3) and on the cylindrical structural element (4) forming a stabilizer half (6).

13. The electromechanical actuating drive according to claim 12, wherein a mechanical adjusting device of the actuator (2) is in a form of a high-ratio planetary gear system.

14. The electromechanical actuating drive according to claim 12, wherein a mechanical adjusting device of the actuator (2) is in a form of a high-ratio strain wave gear.

15. An electromechanical actuating drive (1) comprising an outer housing which is aligned along a longitudinal central axis, a cylindrical structural element (4) extends from and is concentric with the outer housing (3), an outer diameter of the cylindrical structural element (4) is smaller than an outer diameter of the outer housing (3), at least one of the outer housing (3) and the cylindrical structural element (4) is rotatable about the longitudinal central axis, and a wiring harness (13) has a first end connected to a first connection terminal that is connected to the at least one of the outer housing (3) and the cylindrical structural element (4), and the wiring harness comprises at least one electric supply lead and electric control lead (13a, 13b, 13c) that extend from the first connection terminal,
the wiring harness has an opposite end that is connected to a positionally fixed second connection terminal (15),
the first end of the wiring harness (13) extends either tangentially to or concentrically with an outer enveloping surface (14) of the cylindrical structural element (4), and
the wiring harness (13), starting from an area of the first connection terminal, has a shape of a helix.

16. The electromechanical actuating drive according to claim 15, wherein the first connection terminal (10) is in a form of a first plug (11).

17. The electromechanical actuating drive according to claim 16, wherein the outer housing (3) is connected to the cylindrical structural element (4) and forms, with the cylindrical structural element, an annular end face (8), and the first plug (11) is provided with plug contacts (22) that extend toward the end face (8).

18. The electromechanical actuating drive according to claim 15, wherein the wiring harness (13) comprises at least two leads in a form of at least one of the electric supply lead and the electric control lead (13a, 13b, 13c) which are held in place, relative to one another, by at least one holder (18), the at least one holder holds the at least two leads between the first connection terminal and the second connection terminal.

19. The electromechanical actuating drive according to claim 18, wherein the holder (18) is provided with a receiving groove (20) for guiding a separate sensor lead (17), and the sensor lead (17) is guided in a circumferentially extending groove (19) of the first connection terminal.

20. An electromechanical actuating drive comprising:
an outer housing being rotatable about a longitudinal central axis;
a wiring harness comprising at least one electrical lead, the at least one electrical lead being at least one of an electric supply lead and a control lead, and the at least one electrical lead comprises a first end that is connected to a first connection terminal provided on the outer housing and a second end that is connected to a second, positionally fixed plug;
the first end of the wiring harness extends either tangentially to or concentrically with an outer enveloping surface of either the outer housing or a cylindrical structural element connected thereto in a rotationally fixed manner, whose outer diameter is smaller, compared with an outer diameter of the outer housing;
the wiring harness extends, starting from the first end of the wiring harness, concentrically with and a radial distance away from the outer enveloping surface such that the wiring harness being arranged in a transverse plane of the either the outer housing or the cylindrical structural element, and the transverse plane passes through the first connection terminal; and
the first connection terminal is a first plug that is formed by injection molding a plastic around the first end of the wiring harness and, on an outer circumference of the first plug, a circumferentially extending groove is provided to hold a separate sensor lead.

* * * * *